(12) United States Patent
Baxter et al.

(10) Patent No.: US 8,192,504 B2
(45) Date of Patent: Jun. 5, 2012

(54) CATIONIC POLYMER LATEX

(75) Inventors: Steven Michael Baxter, Chalfont, PA (US); Marianne Patricia Creamer, Warrington, PA (US); Alan Wayne Kohr, Schwenksville, PA (US); Joseph Manna, Quakertown, PA (US); Paul Francis David Reeve, Grasse (FR); Halla Ahmad Suleiman, Ambler, PA (US)

(73) Assignee: Rohm and Haas Company, Philadelphia, PA (US)

( * ) Notice: Subject to any disclaimer, the term of this patent is extended or adjusted under 35 U.S.C. 154(b) by 444 days.

(21) Appl. No.: 12/074,789

(22) Filed: Mar. 6, 2008

(65) Prior Publication Data
US 2008/0216978 A1 Sep. 11, 2008

(30) Foreign Application Priority Data
Mar. 9, 2007 (EP) .................................. 07290304.0

(51) Int. Cl.
*B08B 3/04* (2006.01)
*C11D 3/37* (2006.01)
*C11D 1/62* (2006.01)

(52) U.S. Cl. ............ 8/137; 510/327; 510/330; 510/351; 510/357; 510/394; 510/426; 510/475

(58) Field of Classification Search .................. 510/327, 510/330, 351, 357, 394, 426, 475; 8/137
See application file for complete search history.

(56) References Cited

U.S. PATENT DOCUMENTS

| | | | |
|---|---|---|---|
| 3,503,892 A | 3/1970 | Weyna | |
| 4,444,882 A | 4/1984 | Shimizu | |
| 4,469,825 A | 9/1984 | Kowalski | |
| 4,594,363 A | 6/1986 | Blankenship | |
| 4,746,455 A * | 5/1988 | Matsuda et al. | 510/337 |
| 5,476,660 A | 12/1995 | Somasundaran et al. | |
| 5,645,968 A | 7/1997 | Sacripante | |
| 6,035,715 A | 3/2000 | Porter | |
| 6,849,584 B2 | 2/2005 | Geary et al. | |
| 6,881,712 B2 | 4/2005 | Angell | |
| 2002/0052304 A1* | 5/2002 | Aubay et al. | 510/361 |
| 2004/0091445 A1 | 5/2004 | Dykstra | |
| 2004/0110648 A1 | 6/2004 | Jordan | |
| 2004/0115151 A1 | 6/2004 | Giroud | |
| 2005/0038174 A1 | 2/2005 | Suzuki | |
| 2005/0075266 A1 | 4/2005 | Chang | |
| 2005/0192204 A1 | 9/2005 | Trinh et al. | |
| 2006/0057310 A1 | 3/2006 | Suzuki | |
| 2008/0057049 A1* | 3/2008 | Krishnan | 424/94.61 |

FOREIGN PATENT DOCUMENTS

| | | |
|---|---|---|
| EP | 1175484 B1 | 6/2004 |
| EP | 1506980 * | 2/2005 |
| GB | 2432850 A | 6/2007 |
| JP | 63122796 | 5/1988 |
| JP | 02-300298 | 12/1990 |
| JP | 04298208 | 10/1992 |
| JP | 08-248024 | 9/1996 |
| JP | 11-108823 | 4/1999 |
| JP | 2002-318203 | 10/2002 |
| JP | 2005-091089 | 4/2005 |
| WO | 01/16264 | 3/2001 |
| WO | WO03027157 | 4/2003 |

OTHER PUBLICATIONS

J. Zhang, et.al., "Study on Properties of Functional Cationic Polymer Emulsion," J. Jubei University, Natural Science Edition, vol. 20, No. 1, Mar. 1998.
Interfacial Dynamics Corporation, "Detailed Product Information for Amidine" http://www.idclatex.com/details-3.asp.
Interfacial Dynamics Corporation, "Coupling of Proteins to IDC UltraClean Amidine Latex by Passive Adsorption" http://www.idclatex.com/bopy_bgrounder_highactivity-protocol-3.a.

* cited by examiner

*Primary Examiner* — Brian P Mruk
(74) *Attorney, Agent, or Firm* — Carl P. Hemenway

(57) ABSTRACT

There is provided an aqueous liquid domestic composition comprising
(i) one or more active component selected from the group consisting of
(A) 3% to 50% by weight, based on the total solids weight of said domestic composition, one or more softening agent,
(B) 2% to 90% by weight, based on the total solids weight of said domestic composition, one or more anionic surfactant, and
(C) a mixture consisting of
(I) 1% to 25% by weight, based on the total solids weight of said domestic composition, one or more softening agent, and
(II) 5% to 75% by weight, based on the total solids weight of said domestic composition, one or more anionic surfactant, and
(D) 0.1% to 30% by weight, based on the total solids weight of said domestic composition, one or more amphoteric compound; and (ii) one or more cationic polymer latex comprising
(I) 0.5% to 6% by weight, based on the dry weight of said polymer, one or more cationic monomer,
(II) 30% to 99.5 by weight, based on the dry weight of said polymer, polymerized units of one or more aromatic monomer,
(III) optionally, polymerized units of one or more additional monomer.
Also provided is a method of treating paper with such cationic polymer latices.

20 Claims, No Drawings

CATIONIC POLYMER LATEX

BACKGROUND

This patent application claims the benefit of the earlier filed European Patent application serial number 07290304.0 filed on Mar. 9, 2007 under 37 CFR 1.55(a).

It is often desired to provide liquid domestic compositions that are partially or totally opaque. Domestic compositions include, for example, laundry compositions and personal care compositions. In the past, latex polymers have been added to liquid domestic compositions in order to increase the opacity. For example, U.S. Pat. No. 3,503,892 discloses adding, to various domestic compositions, a copolymer latex containing as polymerized units a major portion of styrene and/or methylated styrene and a minor proportion of the reaction product of polyalkylene glycol and maleic anhydride. It has been observed that, when previously known polymer latices are added to some liquid domestic compositions in order to provide opacity, the resulting compositions lack stability. It is desired to provide liquid domestic compositions that are stable and that contain at least one polymer latex that provides complete or partial opacity.

STATEMENT OF THE INVENTION

In one aspect of the present invention, there is provided an aqueous liquid domestic composition comprising
  (i) one or more active component selected from the group consisting of
    (A) 3% to 50% by weight, based on the total solids weight of said domestic composition, one or more softening agent,
    (B) 2% to 90% by weight, based on the total solids weight of said domestic composition, one or more anionic surfactant,
    (C) a mixture consisting of
      (I) 1% to 25% by weight, based on the total solids weight of said domestic composition, one or more softening agent, and
      (II) 5% to 75% by weight, based on the total solids weight of said domestic composition, one or more anionic surfactant, and
    (D) 0.1% to 30% by weight, based on the total solids weight of said domestic composition, one or more amphoteric compound; and
  (ii) one or more cationic polymer latex comprising
    (a) 0.5% to 6% by weight, based on the dry weight of said polymer, polymerized units of one or more cationic monomer,
    (b) 30% to 99.5 by weight, based on the dry weight of said polymer, polymerized units of one or more aromatic monomer,
    (c) optionally, polymerized units of one or more additional monomer.

In a second aspect of the present invention, there is provided a method of treating paper comprising
  (X) forming a paper treatment mixture comprising one or more cationic polymer latex as defined in item (ii) herein above and one or more additional cationic compound, and
  (Y) performing one or both of
    (y1) adding said paper treatment mixture to an aqueous slurry of fibers during a process of making said paper, or
    (y2) applying to the surface of said paper a coating that comprises said paper treatment mixture.

DETAILED DESCRIPTION

As used herein, "(meth)acrylate" means acrylate or methacrylate, and "(meth)acrylic" means acrylic or methacrylic.

As used herein "HE/A monomer" means a monomer that is either a hydroxy-alkyl (meth)acrylate ester or is an amide of (meth)acrylic acid. The nitrogen atom of an amide of (meth) acrylic acid may be substituted or unsubstituted.

As used herein, a composition is "aqueous" if it contains 25% or more water by weight based on the total weight of the composition. Some aqueous compositions contain 40% or more; or 50% or more; water by weight, based on the weight of the composition. In some aqueous compositions, water forms a continuous medium, and one or more other substance is dissolved or dispersed in the continuous liquid medium. As used herein, a substance is "dispersed" in a continuous medium if that substance is in the form of discrete particles, droplets, or bubbles that are distributed throughout that continuous medium. In aqueous compositions in which water forms a continuous liquid medium, the water may or may not be mixed with one or more additional liquids other than water that are miscible with water. In some aqueous compositions with a continuous liquid medium, the continuous liquid medium contains 25% or more water; or 50% or more water; or 75% or more water; or 90% or more; water, by weight based on the weight of the continuous liquid medium. A continuous liquid medium containing 25% or more water, by weight based on the weight of the continuous medium, is known herein as an aqueous medium.

A liquid composition is liquid at 25° C.

A domestic composition is a composition that is suitable for use in a domestic operation. Domestic operations include, for example, laundry operations and personal care operations. Laundry operations include, for example, cleaning operations for fabric and operations normally associated with cleaning operations for fabric. A cleaning operation is any procedure that involves washing (i.e., removal of undesirable material such as stains, soil, dirt, etc.). For example, laundry operations include, for example, pretreatment (i.e., loosening any of stains, soil, dirt, etc., prior to washing); washing; softening; treatment (i.e., delivering one or more materials to the fabric such as, for example, fragrance, water repellents, soil repellents, etc.); drying, and combinations thereof. Domestic compositions suitable for laundry operations may perform any one laundry operation or any combination of laundry operations. Some domestic compositions of the present invention are suitable for softening fabric. Independently, some domestic compositions of the present invention are suitable for delivering fragrance to fabric. Some domestic compositions of the present invention are suitable for both softening fabric and delivering fragrance to fabric.

For other examples of domestic operations, personal care operations include, for example, washing skin or hair, conditioning skin or hair, dyeing hair, styling hair, and combinations thereof. Domestic compositions suitable for personal care operations include, for example, soaps, other compositions for washing skin, skin lotion, cosmetics, shampoo, hair conditioner, compositions that are both shampoo and hair conditioner, hair dye, and hair styling compositions. Some domestic compositions of the present invention are suitable for conditioning hair. Independently, some domestic compositions of the present invention are suitable for delivering fragrance to hair. Some domestic compositions of the present invention are suitable for both conditioning hair and delivering fragrance to hair. Independently, some domestic compositions of the present invention are suitable for both conditioning hair and cleaning hair. Some domestic compositions of the present invention are suitable for performing all of conditioning hair, cleaning hair, and delivering fragrance to hair.

Some domestic compositions, for example, contain one or more of the following active components: anionic surfactant, softening agent, amphoteric compound, a mixture of anionic surfactant and softening agent, a mixture of softening agent and amphoteric compound, or any mixture of any two or more of anionic surfactant, softening agent, and amphoteric compound. Some of such domestic compositions, in addition to anionic surfactant, softening agent, amphoteric compound, or mixture thereof, also optionally contain one or more nonionic surfactant.

Surfactants are compounds, the molecules of which contain both at least one hydrophilic group and at least one hydrophobic group. Some suitable hydrophobic groups, for example, include hydrocarbon chains with 6 or more carbon atoms, or 9 or more carbon atoms, or 10 or more carbon atoms. Some suitable hydrophobic groups are, for example, alkyl groups, alkenyl groups, alkylaryl groups, versions thereof with one or more substituent, versions thereof with one or more ester linkage, versions thereof with one or more ether linkage, versions thereof with one or more amide linkage, combinations thereof, and mixtures thereof.

Among embodiments in which an anionic surfactant is used, suitable anionic surfactants include, for example, carboxylate surfactants, N-acyl sarcosinate surfactants, acylated protein hydrolysate surfactants, sulfonate surfactants, sulfate surfactants, and phosphate ester surfactants. Suitable carboxylate surfactants include, for example, alkyl carboxylates, alkenyl carboxylates, and polyalkoxy carboxylates. Suitable sulfonate surfactants include, for example, alkyl sulfonates, aryl sulfonates, and alkylaryl sulfonates. Some examples of suitable sulfonate surfactants are alkylbenzene sulfonates, naphthalene sulfonates, alpha-olefin sulfonates, petroleum sulfonates, and sulfonates in which the hydrophobic group includes at least one linkage that is selected from ester linkages, amide linkages, ether linkages (such as, for example, dialkyl sulfosuccinates, amido sulfonates, sulfoalkyl esters of fatty acids, and fatty acid ester sulfonates), and combinations thereof. Some suitable sulfate surfactants include, for example, alcohol sulfate surfactants, ethoxylated and sulfated alkyl alcohol surfactants, ethoxylated and sulfated alkyl phenol surfactants, sulfated carboxylic acids, sulfated amines, sulfated esters, and sulfated natural oils or fats. Some suitable phosphate ester surfactants are, for example, phosphate monoesters and phosphate diesters.

Suitable anionic surfactants have corresponding cations. Suitable corresponding cations include, for example, cations of sodium, potassium, ammonium, monoethanolamine, diethanolamine, triethanolamine, magnesium, and mixtures thereof.

Mixtures of suitable anionic surfactants are also suitable.

Some suitable domestic compositions that contain one or more anionic surfactant also contain one or more softening agent. Other suitable domestic compositions that contain one or more anionic surfactant do not contain any softening agent.

Among embodiments in which one or more anionic surfactant is used, in some of such embodiments, the domestic composition of the present invention includes anionic surfactant in the amount of, by solids weight percent based on the solids weight of the domestic composition, 2% or more; or 5% or more; or 10% or more; or 20% or more; or 30% or more; or 40% or more. Independently, when an anionic surfactant is used, in some embodiments the amount of anionic surfactant, by solids weight percent based on the solids weight of the domestic composition, is 90% or less; 70% or less; or 60% or less.

In some embodiments of the present invention, one or more softening agents is used. Softening agents are compounds that, when used for treating fabric, are capable of imparting one or more of the following features to the fabric: a more pleasant feel to the touch after the laundry process is complete; reduced surface friction after the laundry process is complete; lower tendency of the fabric to acquire (for example, during drying in an automatic dryer) a static electrical charge; and a combination thereof.

Among embodiments in which a softening agent is used, suitable softening agents include, for example, the quaternary ammonium salt surfactants described herein below. Some quaternary ammonium salt surfactants that are usefull as softening agents are, for example, dialkyldimethylammonium salt surfactants and esterquats. Another category of suitable softening agents is, for example, water-soluble cationic polymers, including, for example, polymers designated "Polyquaternium" in the International Nomenclature for Cosmetic Ingredients (INCI). Polyquaternium polymers have quaternary ammonium centers. INCI has approved at least 37 different polymers under the polyquatemium designation. Different polymers are distinguished by the numerical value that follows the word "polyquatemium". Some suitable Polyquatemium polymers include, for example, Polyquatemium-16 (CAS Number: 95144-24-4), Polyquatemium-32 (CAS Number: 35429-19-7), Polyquatemium-7 (CAS Number: 26590-05-6), Polyquatemium-10 (CAS Number: 68610-92-4, 81859-24-7, 53568-66-4, 54351-50-7, 55353-19-0), Polyquatemium-37 (CAS Number: 26161-33-1), Polyquatemium-15 (CAS Number: 35429-19-7, 67504-24-9).

In some embodiments in which a water-soluble cationic polymer used, one or more anionic polymer is also present in the composition. Some of such softening agents are described in US Patent Application Publication 2004/0152617. In some embodiments, a water-soluble cationic polymer is used that has at least one cationic monomer as a polymerized unit and has a net cationic charge at one or more points over the pH range of 6 to 11.

In some embodiments of the present invention, one or more cationic surfactant is used. Among embodiments in which a cationic surfactant is used, suitable cationic surfactants include, for example, amine surfactants and quaternary ammonium salt surfactants. Suitable amine surfactants include, for example, primary, secondary, and tertiary alkyl amine surfactants; primary, secondary, and tertiary alkenyl amine surfactants; imidazoline surfactants; amine oxide surfactants; ethoxylated alkylanine surfactants; surfactants that are alkoxylates of ethylene diamine; and amine surfactants where the hydrophobic group contains at least one amide linkage. Suitable quaternary ammonium salt surfactants include, for example, dialkyldimethylammonium salt surfactants, alkylbenzyldimethylammonium salt surfactants, alkyltrimethylammonium salt surfactants, alkylpyridinium halide surfactants, surfactants made by quatemizing tertiary amine compounds, and esterquats (i.e., surfactants that are quaternary ammonium salts with at least one hydrophobic group that contains an ester linkage). In some embodiments, no polymeric softening agent is used.

Suitable quaternary ammonium salt surfactants have corresponding anions. Suitable corresponding anions include, for example, halide ions (such as, for example, chloride ions), methyl sulfate ions, other anions, and mixtures thereof.

Mixtures of suitable cationic surfactants are also suitable.

Some suitable domestic compositions that contain one or more cationic surfactant also contain one or more anionic surfactant. Other suitable domestic compositions that contain one or more cationic surfactant do not contain any anionic surfactant.

Independently, some suitable domestic compositions that contain one or more cationic surfactant also contain one or more polymeric emulsifier. Other suitable domestic compositions that contain one or more cationic surfactant do not contain any polymeric emulsifier.

Among embodiments in which one or more softening agent is used, in some of such embodiments, the domestic composition of the present invention includes softening agent in the amount of, by solids weight percent based on the solids weight of the domestic composition, 3% or more; or 5% or more; or 10% or more; or 20% or more. Independently, when a softening agent is used, in some embodiments the amount of softening agent, by solids weight percent based on the solids weight of the domestic composition, is 50% or less; 40% or less; or 30% or less.

In some embodiments (herein called "mixture" embodiments), a domestic composition of the present invention includes both a cationic surfactant and an anionic surfactant. In mixture embodiments, the anionic surfactant and the cationic surfactant may be present in any proportion to each other. In some mixture embodiments, the amount of anionic surfactant is, for example, by solids weight percent based on the solids weight of the domestic composition, 5% or more; or 10% or more; or 20% or more; or 30% or more. Independently, in some mixture embodiments, the amount of anionic surfactant is, for example, by solids weight percent based on the solids weight of the domestic composition, 75% or less; or 60% or less; or 50% or less. Independently, in some mixture embodiments, the amount of cationic surfactant is, for example, by solids weight percent based on the solids weight of the domestic composition, 1% or more; or 3% or more; or 5% or more. Independently, in some mixture embodiments, the amount of cationic surfactant is, for example, by solids weight percent based on the solids weight of the domestic composition, 25% or less; or 15% or less.

In some embodiments of the present invention, the active component includes one or more amphoteric compound. An amphoteric compound is a compound that contains an anionic group and a cationic group. The anionic group may be in the form of a neutral acidic group over some range of pH values and in the form of an anion at higher pH values. Independently, the cationic group may be in the form of a neutral basic over some range of pH values and in the form of a cation at lower pH values. Some amphoteric compounds have a cationic group that is permanently cationic such as, for example, a quaternary ammonium group or a quaternary phosphonium group. Independently, an amphoteric compound may be polymeric or non-polymeric. Some non-polymeric amphoteric compounds include, for example, amphoteric surfactants. Some amphoteric surfactants are betaines, which have a permanent cationic group and an anionic group that is in anionic form over the range of pH values at which the betaine will be used. One example of a betaine is cocamidopropylbetaine.

It is contemplated that, if the only active component in the domestic composition is a polymeric softening agent or an amphoteric polymer, that active component is a different compound from the cationic polymer described herein as the polymer in the cationic polymer latex.

Among embodiments in which one or more amphoteric compound is used, in some of such embodiments, the domestic composition of the present invention includes amphoteric compound in the amount of, by solids weight percent based on the solids weight of the domestic composition, 0.1% or more; or 0.2% or more; or 0.4% or more; or 0.8% or more. Independently, when an amphoteric compound is used, in some embodiments the amount of amphoteric compound, by solids weight percent based on the solids weight of the domestic composition, is 30% or less; 15% or less; or 10% or less; or 6% or less.

In some embodiments in which one or more amphoteric surfactant is used, the domestic composition also includes one or more anionic surfactant.

In some embodiments of the present invention, the active component is selected from the group consisting of
(A) 5% to 50% by weight, based on the total solids weight of said domestic composition, one or more softening agent,
(C) a mixture consisting of
  (I) 1% to 25% by weight, based on the total solids weight of said domestic composition, one or more softening agent, and
  (II) 5% to 75% by weight, based on the total solids weight of said domestic composition, one or more anionic surfactant, and
(D) 0.1% to 30% by weight, based on the total solids weight of said domestic composition, one or more amphoteric compound.

In some embodiments of the present invention, the active component includes 5% to 50% by weight, based on the total solids weight of said domestic composition, one or more cationic surfactant.

In some embodiments, the aqueous liquid domestic composition of the present invention contains active component in the amount, by solid weight of active component based on total weight of the aqueous liquid domestic composition, of 1% or more; or 2% or more. Independently, in some embodiments, the aqueous liquid domestic composition of the present invention contains active component in the amount, by solid weight of active component based on total weight of the aqueous liquid domestic composition, of 50% or less; or 45% or less.

The practice of the present invention involves the use of one or more cationic polymer. A "polymer," as used herein and as defined by F W Billmeyer, JR. in *Textbook of Polymer Science*, second edition, 1971, is a relatively large molecule made up of the reaction products of smaller chemical repeat units. Normally, polymers have 11 or more repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. Chemicals that react with each other to form the repeat units of a polymer are known herein as "monomers," and a polymer is said herein to be made of "polymerized units" of the monomers that reacted to form the repeat units. The chemical reaction or reactions in which monomers react to become polymerized units of a polymer are known herein as "polymerizing" or "polymerization."

Polymer molecular weights can be measured by standard methods such as, for example, size exclusion chromatography or intrinsic viscosity. Generally, polymers have weight-average molecular weight (Mw) of 1,000 or more.

As defined herein, a cationic polymer is a polymer that contains one or more cationic monomer as polymerized units. Cationic monomers are compounds that form polymerized units in which at least one cation is covalently attached to the polymer. The anion or anions corresponding to the covalently-attached cation or cations may be in solution, in a complex with the cation, located elsewhere on the polymer, or a combination thereof.

In some embodiments, one or more cationic monomers are used that contain a cation that exists in cationic form when residing in water at some range of pH values useful for domestic operations, while that cation may be in neutral form at some other pH values. In some embodiments, at least one cationic monomer is used that is in neutral form during polymerization; in such embodiments, after polymerization (before or during a laundry process), conditions surrounding the polymer (such as, for example, pH) are altered so that the polymerized unit resulting from that cationic monomer acquires a positive charge.

Independently, in some embodiments, one or more cationic monomers are used that contain a cationic group that is permanently in cationic form (i.e., a cation that remains in cationic form at all pH values below 9). Cations that are permanently in cationic form include, for example, quaternary ammonium salts. In some embodiments, one or more cationic polymer is used in which every cationic group is permanently in cationic form. In some embodiments, every cationic group in every cationic polymer that is used is permanently in cationic form.

The anion corresponding to the cation of a suitable cationic monomer may be any type of anion. Some suitable anions are, for example, halides (including, for example, chloride, bromide, or iodide), hydroxide, phosphate, sulfate, hydrosulfate, ethyl sulfate, methyl sulfate, formate, acetate, or any mixture thereof.

Quaternary ammonium salt compounds that are suitable as cationic monomers include, for example, quaternary(meth)acrylic compounds, diallyldialkylammonium quaternary compounds, and mixtures thereof. Quaternary(meth)acrylic compounds include trialkylammonium quaternary esters or amides of (meth)acrylic acid, and mixtures thereof.

Quaternary(meth)acrylic compounds have the structure

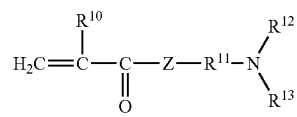

where $R^1$ has the structure

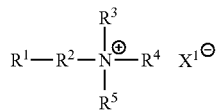

where $R^6$ is either hydrogen or a methyl group; $R^2$ is a bivalent alkyl group; each of $R^3$, $R^4$, and $R^5$ is, independently, a methyl or ethyl or benzyl group; Z is either —O— or —NH—; and $X^{1\ominus}$ is an anion, for example any of the anions discussed herein above as suitable anions corresponding to cations of suitable cationic monomers. In some embodiments, $R^6$ is hydrogen. Independently, in some embodiments, $R^2$ is —CH$_2$—CH$_2$—CH$_2$— or —CH$_2$—CH$_2$— or —CH$_2$—. In some embodiments, $R^2$ is —CH$_2$—CH$_2$—CH$_2$—. Independently, in some embodiments, one, two, or all three of $R^3$, $R^4$, and $R^5$ are methyl groups. Independently, in some embodiments, $X^{1\ominus}$ is a chloride ion.

Diallyldialkylammonium quaternary compounds have the structure

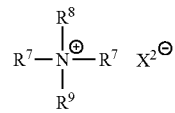

where each $R^7$ is an allyl group; each of $R^8$ and $R^9$ is, independently, an alkyl group with 1 to 3 carbon atoms; and $X^{2\ominus}$ is an anion, for example any of the anions discussed herein above as suitable anions corresponding to cations of suitable cationic monomers. In some embodiments, each of $R^8$ and $R^9$ is a methyl group. Independently, in some embodiments, $X^{2\ominus}$ is a chloride ion.

Under many common polymerization conditions, a diallyldialkyammonium quaternary monomer forms a polymerized unit that is a 5-membered ring.

Further examples of suitable cationic monomers are aminoalkyl esters or aminoalkyl amides of (meth)acrylic acid, which have the structure

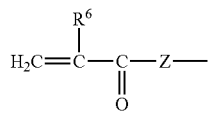

where $R^{10}$ is hydrogen or a methyl group, $R^{11}$ is a bivalent alkyl group, Z is either —O— or —NH—, and $R^{12}$ and $R^{13}$ is each independently either a hydrogen, a methyl group, or an ethyl group. In some embodiments, $R^{10}$ is a methyl group. Independently, in some embodiments, $R^{11}$ is either an ethyl group or a propyl group. Independently, in some embodiments, $R^{12}$ and $R^{13}$ are both methyl groups. Suitable cationic monomers that are aminoalkyl esters of (meth)acrylic acid include, for example, 2-(dimethylamino)ethyl methacrylate, 2-(dimethylamino)ethyl acrylate, and 3-dimethylaminopropyl acrylate.

In some embodiments, one or more cationic polymer is used that contains one or more polymerized units of an aminoalkyl ester or aminoalkyl amide of (meth)acrylic acid. Independently, in some embodiments, one or more cationic polymer is used that contains no polymerized units of an aminoalkyl ester or aminoalkyl amide of (meth)acrylic acid. In some embodiments, no cationic polymer is used that contains any polymerized units of an aminoalkyl ester or aminoalkyl amide of (meth)acrylic acid.

In some embodiments, one or more cationic polymer is used that contains one or more polymerized units of a cationic monomer that has an amidine group. An amidine group is the chemical group —C(=NH)NH$_2$. Independently, in some embodiments, one or more cationic polymer is used that contains no polymerized units of an aminoalkyl ester or aminoalkyl amide of (meth)acrylic acid. In some embodiments, no cationic polymer is used that contains any polymerized units of an aminoalkyl ester or aminoalkyl amide of (meth)acrylic acid.

Independently, also contemplated as cationic monomer units in cationic polymers of the present invention are monomer units that are post-modified. As used herein, a "post-modified" cationic monomer unit is a monomer unit that, during polymerization, does not have a cationic group but does have a reactive group. After completion of polymerization, that reactive group is then reacted in a manner that yields a cationic group attached to that monomer unit of the polymer. For example, a polymer may be made that has polymerized units of a monomer that contains an epoxy group; after polymerization, the epoxy group could be modified by appropriate chemical reaction to yield a cationic group attached to that polymerized unit, and that polymerized unit would be considered herein to be a polymerized unit of a cationic monomer and is known herein as a "post-modified polymerized unit of a cationic monomer." One method of performing such post-modification reactions is taught by D.-J. Voorn, et. al., in *Macromolecules*, vol. 38, p. 3653-3662, 2005.

In some embodiments, one or more cationic polymer is used that contains one or more polymerized units of a post-modified cationic monomer. Independently, in some embodiments, one or more cationic polymer is used that contains no polymerized units of a post-modified cationic monomer. In some embodiments, no cationic polymer is used that contains any polymerized units of a post-modified cationic monomer.

Mixtures of suitable cationic monomers are also suitable.

In some embodiments, every monomer unit in every cationic polymer that is used is a polymerized unit of a quaternary ammonium salt.

In some embodiments, a cationic polymer is used that contains cationic monomer as polymerized units in the amount, by weight based on the dry weight of that cationic polymer, of 0.5% or more; or 1% or more; or 2% or more; or 3% or more. Independently, in some embodiments, a cationic polymer is used that contains cationic monomer as polymerized units in the amount, by weight based on the dry weight of that cationic polymer, of 6% or less; or 5% or less. The amount of cationic monomer present as polymerized units in a cationic polymer, by weight based on the dry weight of that cationic polymer, is denoted herein as "Cat %."

A cationic polymer of the present invention also contains, as polymerized units, one or more aromatic monomer. An aromatic monomer is any monomer that contains an aromatic ring. In some embodiments, styrene or substituted styrene or a mixture thereof is used. Some suitable substituted styrenes are, for example, alkyl-substituted styrenes such as, for example, methyl styrenes (including, for example, alpha-methyl styrene) and n-propyl styrenes. Some additional suitable substituted styrenes are, for example, halo-substituted styrenes such as, for example, o-chloro styrene and 2,6-dichloro styrene. Some additional suitable substituted styrenes are, for example, alkoxy-substituted styrenes such as, for example, o-methoxy styrene, m-methoxy styrene. Some additional suitable aromatic monomers are, for example, (meth)acrylate esters in which the ester group contains an aromatic ring, such as, for example, benzyl(meth)acrylate and diphenylmethyl(meth)acrylate. Some additional suitable aromatic monomers are, for example, phenyl(meth)acrylates, such as, for example, pentabromophenyl(meth)acrylate, pentachlorophenyl(meth)acrylate, phenyl alpha-bromo acrylate, and p-bromophenyl(meth)acrylate. Some additional suitable aromatic monomers are, for example, 4-methoxy-2-methyl styrene, styrene sulfide, vinyl phenyl sulfide, and N-benzyl (meth)acrylamide.

In some embodiments, styrene is used. In some embodiments in which styrene is used, styrene is the only aromatic monomer that is present in the cationic polymer.

In the practice of the present invention, one or more cationic polymer is used that contains aromatic monomer as polymerized units in an amount, by weight based on the dry weight of that cationic polymer, that is 30% or more and also is 99.5% or less. In some embodiments, a cationic polymer is used that contains aromatic monomer as polymerized units in the amount, by weight based on the dry weight of that cationic polymer, of 40% or more; or 50% or more; or 60% or more. Independently, in some embodiments, a cationic polymer is used that contains aromatic monomer as polymerized units in the amount, by weight based on the dry weight of that cationic polymer, of 93% or less; or 90% or less; or 80% or less. The amount of aromatic monomer present as polymerized units in a cationic polymer, by weight based on the dry weight of that cationic polymer, is denoted herein as "Ar %."

In some embodiments, one or more cationic polymer of the present invention is used that has no monomer other than one or more cationic monomer and one or more aromatic monomer.

In some embodiments, one or more cationic polymer of the present invention is used that has, as polymerized units, one or more additional monomer (i.e., a monomer that is neither a cationic monomer nor an aromatic monomer and that is present in addition to the one or more cationic monomer and the one or more aromatic monomer). The total amount of all additional monomer or monomers present as polymerized units in a cationic polymer, by weight based on the dry weight of that cationic polymer, is denoted herein as "Add %." It is contemplated that Add % will be equal to 100%−(Cat %+Ar %).

In some embodiments, in a cationic polymer of the present invention, the ratio of the sum of the weights all additional monomer or monomers present as polymerized units to the weight of all aromatic monomer or monomers present as polymerized units is 0.05 or higher; or 0.1 or higher; or 0.2 or higher. Independently, in some embodiments, in a cationic polymer of the present invention, the ratio of the sum of the weights all additional monomer or monomers present as polymerized units to the weight of all aromatic monomer or monomers present as polymerized units is 2.5 or lower; or 2 or lower; or 1.5 or lower; or 1 or lower; or 0.75 or lower.

Some suitable additional monomers include, for example, anionic monomers, lower-alkyl(meth)acrylate esters, higher-aliphatic(meth)acrylate esters, HE/A monomers (as defined herein above), crosslinking monomers, substituted or unsubstituted amides of (meth)acrylic acid, other monomers capable of copolymerizing with cationic monomer and aromatic monomer, and mixtures thereof.

Anionic monomers are compounds that form polymerized units in which at least one anion is covalently attached to the polymer backbone. The cation or cations corresponding to the covalently-attached anion or anions may be in solution, in a complex with the anion, located elsewhere on the polymer, or a combination thereof. In some embodiments, one or more anionic monomers are used that contain an anion that exists in anionic form when residing in water at some range of pH values useful for laundry operations, while that anion may be in neutral form at some other pH values. In some embodiments, at least one anionic monomer is used that is in neutral form during polymerization; in such embodiments, after polymerization (before or during a laundry process), conditions surrounding the polymer (such as, for example, pH) are altered so that the polymerized unit resulting from that anionic monomer acquires a negative charge.

Some suitable anionic monomers are, for example, ethylenically unsaturated acid monomers, including, for example, ethylenically unsaturated carboxylic acid monomers, maleic monomers, and ethylenically unsaturated sulfonic acid monomers. Some suitable anionic monomers are, for example, monoethylenically unsaturated anionic monomers. Suitable unsaturated carboxylic acid monomers include, for example, acrylic acid, methacrylic acid, itaconic acid, half-esters of itaconic acid, and mixtures thereof. Suitable maleic monomers include, for example, maleic acid, maleic anhydride, half-esters thereof, and substituted versions thereof. Suitable unsaturated sulfonic acid monomers include, for example, 2-(meth)acrylamido-2-methylpropanesulfonic acid.

In some embodiments, the cationic polymer of the present invention has no ethylenically unsaturated acid monomer as polymerized units. In some embodiments, the cationic polymer of the present invention has no anionic monomer as polymerized units.

A cationic polymer that also contains one or more anionic monomer as polymerized units is called herein an "ampholytic" polymer.

In some embodiments in which one or more anionic monomer is present as polymerized units in a cationic polymer of the present invention (i.e., an ampholytic polymer of the present invention), the amount of anionic monomer can usefully be characterized by the ratio of the sum of the weights all anionic monomer or monomers present as polymerized units to the weight of all aromatic monomer or monomers present as polymerized units. In some embodiments, that ratio of weights is 0.01 or higher; or 0.02 or higher. Independently, in some embodiments, that ratio of weights is 0.2 or lower; or 0.1 or lower; or 0.05 or lower.

Independently, in some embodiments in which one or more anionic monomer is present as polymerized units in a cationic polymer of the present invention, the amount of anionic monomer can usefully be characterized by the ratio of the sum of the equivalents of all anionic monomer or monomers present as polymerized units to the equivalents of all cationic monomer or monomers present as polymerized units. In some embodiments, that ratio of equivalents is 0.25 or higher; or 0.5 or higher; or 0.8 or higher; or 1 or higher. Independently, in some embodiments, that ratio of equivalents is 5 or lower; or 4 or lower; or 3 or lower.

Lower-alkyl(meth)acrylate esters are alkyl esters of acrylic acid or methacrylic acid, where the alkyl group is an unsubstituted alkyl group having 8 or fewer carbon atoms. In some embodiments, a cationic polymer of the present invention includes one or more lower-alkyl(meth)acrylate esters as polymerized units. In some embodiments, a cationic polymer of the present invention includes one or more lower-alkyl methacrylate esters as polymerized units. In some embodiments, a cationic polymer of the present invention includes methyl methacrylate as polymerized units.

In some embodiments, the cationic polymer of the present invention has no lower-alkyl(meth)acrylate esters as polymerized units.

In some embodiments, in a cationic polymer of the present invention, the ratio of the sum of the weights all lower-alkyl (meth)acrylate ester or esters present as polymerized units to the weight of all aromatic monomer or monomers present as polymerized units is 0.02 or higher; or 0.05 or higher; or 0.1 or higher. Independently, in some embodiments, in a cationic polymer of the present invention, the ratio of the sum of the weights all lower-alkyl(meth)acrylate ester or esters present as polymerized units to the weight of all aromatic monomer or monomers present as polymerized units is 3 or lower; or 1 or lower; or 0.3 or lower; or 0.2 or lower.

Higher-aliphatic(meth)acrylate esters are aliphatic esters of acrylic acid or methacrylic acid, where the aliphatic group is an unsubstituted hydrocarbon group having 9 or more carbon atoms, where the aliphatic group may be saturated or unsaturated. In some embodiments, a higher-aliphatic(meth) acrylate ester is used in which the aliphatic group has 18 or fewer carbon atoms. In some embodiments, a cationic polymer of the present invention includes one or more higher-aliphatic(meth)acrylate esters as polymerized units. In some embodiments, a cationic polymer of the present invention includes one or more higher-aliphatic methacrylate esters as polymerized units. In some embodiments, a cationic polymer of the present invention includes, as polymerized units, one or more of lauryl methacrylate, stearyl methacrylate, and mixtures thereof.

In some embodiments, the cationic polymer of the present invention has no higher-aliphatic(meth)acrylate esters as polymerized units.

In some embodiments, in a cationic polymer of the present invention, the ratio of the sum of the weights all higher-aliphatic(meth)acrylate ester or esters present as polymerized units to the weight of all aromatic monomer or monomers present as polymerized units is 0.02 or higher; or 0.05 or higher; or 0.07 or higher. Independently, in some embodiments, in a cationic polymer of the present invention, the ratio of the sum of the weights all higher-aliphatic(meth)acrylate ester or esters present as polymerized units to the weight of all aromatic monomer or monomers present as polymerized units is 2 or lower; or 1 or lower; or 0.3 or lower; or 0.2 or lower.

In some embodiments, the cationic polymer of the present invention has one or more HE/A monomer as polymerized units. In other embodiments, the cationic polymer of the present invention has no HE/A monomer as polymerized units.

In some embodiments, one or more HE/A monomer is used that is an amide of (meth)acrylic acid. In some of such embodiments the nitrogen atom of the amide group has one or two substituents. Substituents may be, for example alkyl groups, such as, for example methyl or ethyl groups. In some embodiments in which an HE/A monomer is used that is an amide of (meth)acrylic acid, there is no substituent on the nitrogen atom. It is contemplated that, in some embodiments, one or more HE/A monomer is used that is an amide of (meth)acrylic acid that does not qualify as a cationic monomer as defined herein above, because the amide group remains in neutral form under the conditions of use of the domestic composition of the present invention.

In some embodiments, the cationic polymer of the present invention has no amides of (meth)acrylic acid as polymerized units.

In some embodiments, one or more HE/A monomer is used that is a hydroxy-alkyl(meth)acrylate ester. Hydroxy-alkyl (meth)acrylate esters are esters of acrylic acid or methacrylic acid, where the ester group is a hydroxy-alkyl group (i.e., an alkyl group with a hydroxyl group attached). In some embodiments, a cationic polymer of the present invention includes one or more hydroxy-alkyl(meth)acrylate esters as polymerized units, where the hydroxy-alkyl group is hydroxyethyl or hydroxypropyl or a mixture thereof. In some embodiments, a cationic polymer of the present invention includes, as polymerized units, one or more of hydroxyethyl acrylate, hydroxyethyl methacrylate, hydroxypropyl acrylate, hydroxypropyl methacrylate, and mixtures thereof. In some embodiments, a cationic polymer of the present invention includes, as polymerized units, one or more of hydroxyethyl acrylate, hydroxyethyl methacrylate, or mixtures thereof.

In some embodiments, the cationic polymer of the present invention has no hydroxy-alkyl(meth)acrylate esters as polymerized units.

In some embodiments, in a cationic polymer of the present invention, the ratio of the sum of the weights all HE/A monomer or monomers present as polymerized units to the weight of all aromatic monomer or monomers present as polymerized units is 0.02 or higher; or 0.05 or higher; or 0.1 or higher. Independently, in some embodiments, in a cationic polymer of the present invention, the ratio of the sum of the weights all HE/A monomer or monomers present as polymerized units to the weight of all aromatic monomer or monomers present as polymerized units is 2 or lower; or 1 or lower; or 0.3 or lower; or 0.2 or lower.

Crosslinking monomers are compounds that are capable of copolymerizing with cationic monomer and aromatic monomer and are capable of forming crosslinks in the cationic polymer of the present invention.

Among embodiments in which crosslinking monomer is used, some suitable crosslinking monomers, for example, are multiethylenically unsaturated compounds (i.e., compounds with more than one carbon-carbon double bond). Some suitable crosslinking monomers are, for example, also aromatic monomers, such as, for example, divinyl benzene. Other suitable crosslinking monomers are not aromatic monomers. Some suitable crosslinking monomers are, for example, esters of (meth)acrylic acid with a polyol (i.e., a compound with two or more hydroxyl groups).

In some embodiments, in a cationic polymer of the present invention, the ratio of the sum of the weights of all crosslinking monomers present as polymerized units to the weight of all aromatic monomer or monomers present as polymerized units is 0.001 or higher; or 0.002 or higher; or 0.005 or higher. Independently, in some embodiments, in a cationic polymer of the present invention, the ratio of the sum of the weights of all crosslinking monomers present as polymerized units to the weight of all aromatic monomer or monomers present as polymerized units is 0.1 or lower; or 0.07 or lower; or 0.05 or lower; or 0.02 or lower, or 0.01 or lower.

In some embodiments, the cationic polymer of the present invention has no crosslinking monomer as polymerized units.

In some embodiments, the cationic polymer has polymerized units only of aromatic monomer and cationic monomer. In such embodiments, no additional monomer is used in the preparation of the cationic polymer. It is contemplated that, in such embodiments, the cationic polymer may also contain minor impurities and, independently, may also include end groups that are fragments from initiators and/or chain transfer agents.

The composition of the present invention contains one or more cationic polymer that is in the form of a latex. A latex is a collection of polymer particles that form a stable dispersion in an aqueous medium.

The particles in a latex can usefully be characterized by the mean diameter of the particles, which can be determined by well known methods, for example by light scattering. In some embodiments, a cationic polymer latex is used that has mean diameter of its particles of 100 nm or larger; or 125 nm or larger; or 150 nm or larger; or 160 nm or larger. Independently, in some embodiments, a cationic polymer latex is used that has mean diameter of its particles of 400 nm or smaller; or 300 nm or smaller; or 250 nm or smaller; or 200 nm or smaller.

One useful method of characterizing an aqueous polymer latex is the zeta potential, which is a measure of the electrical stabilization of the latex particles, and which is measured at 25° C. Zeta potential can be measured using, for example, a Malvern Zetasizer™ instrument.

Some of the cationic polymers of the present invention that have no anionic monomer as polymerized units have zeta potential at pH=4.5 of 20 mV or higher; or 30 mV or higher; or 40 mV or higher.

Some of the ampholytic polymer latices of the present invention have zeta potential of 20 mV or higher at relatively low pH and have zeta potential of 0 to 20 mV at relatively higher pH. Some of such ampholytic polymer latices have zeta potential below zero at still higher pH. It is contemplated that a cationic polymer latex with zeta potential of 20 mV or greater has good mechanical stability, while those with zeta potential of 0 to 20 mV have relatively poor mechanical stability. As used herein, the "stability point" of an ampholytic polymer latex is the highest pH at which the ampholytic polymer latex has zeta potential of 20 mV or higher. While the present invention is not limited to any particular mechanism, it is contemplated that a domestic composition containing such an ampholytic polymer latex of the present invention could be in contact with a substrate while the pH is below the stability point of that ampholytic polymer latex. It is contemplated that, if the pH were then raised slightly above the stability point, the ampholytic polymer latex would have zeta potential of 0 to 20 mV and thus would be unstable, and the polymer particles would have a strong tendency to collect on the substrate.

It is contemplated that, in some embodiments of the present invention, such ampholytic polymer latices could be used in an operation in which a rise in pH could be effected in order to cause a desirable deposition of ampholytic polymer (along with any hydrophobic soluble material, if any, that may be adsorbed onto or absorbed into the polymer particles) onto a substrate.

In some embodiments, an ampholytic polymer is used that has stability point at pH of 8 or lower; or pH of 7 or lower. Independently, in some embodiments, an ampholytic polymer is used that has stability point at pH of 3 or higher; or pH of 4 or higher.

Some of the ampholytic polymers of the present invention are known herein as "WAQ" polymers. All of the cationic monomers present in a WAQ polymer as polymerized units are one or more quaternary ammonium salt, and all of the anionic monomers present in a WAQ polymer are acidic monomers with pKa between 3 and 6. In a WAQ polymer, the ratio of the equivalents of anionic monomer to cationic monomer is 1 or greater.

Another characteristic of the cationic polymer latex of the present invention is the refractive index of the cationic polymer. One useful method of determining the refractive index of a polymer of interest is the calculation method in which each monomer that is used to make the polymer of interest is assigned a contribution value, which is the refractive index of the homopolymer made from that monomer. The calculated refractive index of the polymer of interest is then the weighted average of the contribution values of the monomers used in making the polymer, where the weighting factor for the contribution value of each monomer is the mole fraction of that monomer in the polymer of interest. The refractive indices of the various homopolymers have been measured, and values are generally available in the published literature. The refractive indices of some homopolymers are listed herein below in the Examples. In some embodiments, the refractive index of the cationic polymer is 1.3 or higher; or 1.4 or higher; or 1.45 or higher; or 1.5 or higher; or 1.54 or higher.

While the present invention is not limited to any specific mechanism, it is contemplated that the cationic polymer latex of the present invention increases the opacity of some aqueous liquid compositions because the particles of the cationic polymer latex scatter light. One characteristic of such particles that improves their ability to scatter light when suspended in water is the difference between the refractive index of the particle and the refractive index of water. It is contemplated that the refractive index of the particle is larger than the refractive index of water, and thus a larger difference is obtained by providing particles with a larger index of refraction.

In some embodiments, a latex is used that is formed by aqueous emulsion polymerization. Aqueous emulsion polymerization involves monomer, initiator, and surfactant in the presence of water. In some embodiments, at least one surfactant is used during aqueous emulsion polymerization that is selected from alkyl sulfates, alkylaryl sulfates, alkyl or aryl polyoxyethylene nonionic surfactants, and mixtures thereof. In some embodiments, no polyvinyl alcohol is used in the process of making the cationic polymer latex of the present invention. In some embodiments, no polyvinyl alcohol is present in the liquid domestic composition of the present invention.

In some embodiments, a cationic polymer latex is formed by a process of emulsion polymerization that is performed in the presence of one or more molecular encapsulation agents. Some suitable molecular encapsulation agents, for example, are cavitates (i.e., compounds that provide a cavity within each molecule of complexing agent). Suitable cavitates include, for example, coronates, cryptates, cyclophanes, calixarenes, cyclodextrins, amyloses, cucurbiturils, molecular cleft compounds, other cavitates, and mixtures thereof.

Cyclodextrins are compounds whose molecules are cone-shaped structures that have structures that are made from 6 or more glucose units. Cyclodextrins include such compounds that may or may not be further modified, for example by addition of an alkyl group (such as, for example, a methyl group). As used herein, a statement that a cyclodextrin is made from certain glucose units is to be understood as a description of the structure of the cyclodextrin molecule, which may or may not be actually made by reacting those certain glucose molecules. Cyclodextrins may be made from as many as 32 glucose units. Cyclodextrins that are made from 6, 7, and 8 glucose units are known, respectively, as alpha-cyclodextrin, beta-cyclodextrin, and gamma-cyclodextrin. In some embodiments, exactly one of alpha-cyclodextrin, beta-cyclodextrin, methyl beta-cyclodextrin, or gamma-cyclodextrin is used. In some embodiments, a mixture of two or more of alpha-cyclodextrin, beta-cyclodextrin, methyl beta-cyclodextrin, and gamma-cyclodextrin is used. Independently, in some embodiments, no molecular encapsulation agent other than a cyclodextrin is used.

In some embodiments, emulsion polymerization of cationic polymer latex is performed by a method that includes the steps of adding one or more monomer (which may be neat, in solution, in aqueous emulsion, or a combination thereof) to a vessel that contains, optionally with other ingredients, water and molecular encapsulation agent.

In some embodiments involving molecular encapsulation agent, the amount of molecular encapsulation agent used is, by weight based on the total weight of all monomers used in the polymerization process, 0.5% or more; or 1% or more; or 2% or more. Independently, in some embodiments involving molecular encapsulation agent, the amount of molecular encapsulation agent used is, by weight based on the total weight of all monomers used in the polymerization process, 8% or less; or 5% or less; or 3% or less.

In some embodiments, the composition of the present invention is formed by adding sufficient types and amounts of surfactant or surfactants during the emulsion polymerization process so that the resulting latex qualifies as a composition of the present invention without further addition of latex. Among such embodiments, further surfactant may or may not be added to the latex after the completion of the emulsion polymerization process.

Also contemplated are embodiments in which the type and amount of surfactant or surfactants that are used during the emulsion polymerization process are such that the resulting cationic polymer latex has insufficient surfactant to qualify as a domestic composition of the present invention. In such embodiments, it is contemplated that further surfactant or surfactants will be mixed with such a cationic polymer latex in order to make a composition of the present invention.

Aqueous emulsion polymerization may be performed, for example, with a water soluble initiator or a mixture of water soluble initiators. Suitable initiators include, for example, water soluble peroxides, such as, for example, sodium or ammonium persulfate. Suitable initiators also include, for example, oxidants (such as, for example, persulfates or hydrogen peroxide) in the presence of reducing agents (such as, for example, sodium bisulfite or isoascorbic acid) and/or polyvalent metal ions, to form an oxidation/reduction pair to generate free radicals at any of a wide variety of temperatures. Additional suitable initiators are water soluble azo initiators, including, for example, cationic azo initiators such as, for example, 2,2'-azobis(2-methylpropionamide)dihydrochloride.

Also contemplated are emulsion polymerizations that employ one or more oil-soluble initiators, including, for example, oil-soluble azo initiators.

In some embodiments, the cationic polymer latex does not form core/shell latex particles. Independently, in some embodiments, the cationic polymer latex is in the form of solid particles that do not have voids.

Independently, in some embodiments, the cationic polymer latex is a single-phase polymer composition. That is, if the water were removed from the cationic polymer latex and the glass transition of the solid polymer were analyzed with differential scanning calorimetry, only one glass transition would be found. It is contemplated that such a single-phase polymer latex is prepared with a single stage process. As used herein, a single stage process is a process in which, once polymerization is completed to form a particular polymer, no further polymerization is performed in the presence of that particular polymer, other than an optional chase process involving, at most, monomer in the amount of 2% by weight, based on the solid weight of that particular polymer.

The amount of cationic polymer latex that is present in an aqueous liquid domestic composition of the present invention can usefully be characterized by the weight of solid cationic polymer as a percentage of the total weight of the aqueous liquid domestic composition. This characterization is known herein as "polymer solid weight on total." In some embodiments, the amount of cationic polymer latex, characterized as polymer solid weight on total, is 0.02% or more; or 0.05% or more; or 0.1% or more; or 0.2% or more. Independently, in some embodiments, the amount of cationic polymer latex, characterized as polymer solid weight on total, is 12% or less; or 6% or less; or 3% or less; or 1.5% or less.

In some embodiments, the domestic composition of the present invention contains one or more adjuvant. Adjuvants are materials other than surfactants that improve the cleaning process. Adjuvants include, for example, laundry adjuvants, personal care adjuvants, and mixtures thereof.

In some of the embodiments in which one or more adjuvant is used, the aqueous liquid domestic composition of the present invention contains adjuvants, in the amount, by total solid weight of all adjuvants based on total weight of the aqueous liquid domestic composition, of 1% or more; or 2% or more. Independently, in some of the embodiments in which one or more adjuvant is used, the aqueous liquid domestic composition of the present invention contains adjuvants in the amount, by total solid weight of all adjuvants based on total weight of the aqueous liquid domestic composition, of 45% or less; or 40% or less.

In some embodiments, the domestic composition of the present invention contains one or more laundry adjuvants. Laundry adjuvants include, for example, hydrotropes, builders, cellulose derivatives, dispersants, enzymes, enzyme stabilizing agents, fluorescent whitening agents, bleaching agents, and mixtures thereof.

Among embodiments in which one or more hydrotropes are used, suitable hydrotropes include, for example, alcohols, glycols, alkanolamines, aryl sulfonates, and mixtures thereof.

Builders are materials that remove hardness ions from the water used in the laundry process. In embodiments in which one or more builders are used, suitable builders include, for example, phosphates, carbonates, silicates, zeolites, sequestering agents, neutral soluble salts, and mixtures thereof.

Cellulose derivatives are believed to contribute to prevention of redeposition of soil during the laundry process. Among embodiments in which one or more cellulose derivatives are used, suitable cellulose derivatives include, for example, sodium carboxymethylcellulose, methylcellulose, hydroxyalkylcellulose, and mixtures thereof.

Among embodiments in which one or more dispersants, are used, some suitable dispersants include, for example, (meth)acrylic acid polymers. Some suitable (meth)acrylic acid polymers include, for example, homopolymers of acrylic acid, homopolymers of methacrylic acid, copolymers of methacrylic acid and acrylic acid, copolymers of acrylic acid and/or methacrylic acid with other monomers, and mixtures thereof. Other monomers that may optionally be copolymerized with acrylic acid and/or methacrylic acid include, for example, cationic monomers and the additional monomers described herein above as suitable for copolymerizing with cationic monomers. Independently, among embodiments in which one or more dispersants are used, suitable dispersants include, for example, (meth)acrylic acid polymers or copolymers with weight-average molecular weight below 70,000, or (meth)acrylic acid polymers or copolymers with weight-average molecular weight below 10,000. Independently, among embodiments in which one or more (meth)acrylic acid polymers or copolymers are used, some of such embodiments also include one or more cellulose derivatives.

Among embodiments in which one or more enzymes are used, suitable enzymes include, for example, proteases, amylases, lipases, cellulases, peroxidases, and mixtures thereof.

Among embodiments in which one or more bleaching agents are used, suitable bleaching agents include, for example, sodium percarbonate, sodium perborate tetrahydrate, sodium perborate monohydrate, and mixtures thereof.

Some examples of some suitable domestic compositions, including some examples of some suitable surfactants, can be found in *Surfactants in Consumer Products*, edited by J. Falbe, Springer-Verlag, Heidelberg, Germany, 1987.

In some embodiments, the domestic composition of the present invention is suitable for use as a personal care composition. Some of such personal care compositions may be, for example, hair care formulations (including, for example, shampoos, conditioning shampoos, hair dyes, hair conditioners, gels, pomades, mousses and hair sprays) and skin care and nail care formulations (including, for example, nail coatings, cosmetics, astringents, depilatories, facial make-up formulations, sunscreens and sunblocks, premoistened wipes, hand creams, hand and body soaps, skin cleansers, and hand and body lotions). Some illustrative examples of personal care compositions are given in *The chemistry and Manufacture of Cosmetics, Volume II, Formulating*, third edition, 2000, Allured Publishing Company, Carol Stream, Ill., USA.

Personal care compositions may include one or more personal care adjuvant, including, for example, proteins, synthetic oils, vegetable or animal oils, silicone oils, waxes, resins, gums, humectants, pigments, acidifying or alkalinizing agents, preservatives, dispersants, suspending agents, emollients, (C1-C20) alcohol solvents, sunscreen agents, perfumes, rheology modifiers or thickeners (including, for example, hydrophobically-modified ethoxylated urethane resins), fragrances, conditioning agents, softeners, antistatic aids, pigments, dyes, tints, colorants, antioxidants, reducing agents and oxidizing agents, film forming materials, stabilizers, neutralizers, preservatives, insecticides, plasticizers, antifoaming agents, leveling aids, excipients, vitamins, natural extracts, proteins, sequestrants, dispersants, antioxidants, suspending agents, and mixtures thereof. Some illustrative examples of personal care adjuvants are given in *The chemistry and Manufacture of Cosmetics, Volume III, Ingredients*, third edition, 2000, Allured Publishing Company, Carol Stream, Ill., USA.

In some embodiments of the present invention, the cationic polymer may be suitable as a delivery vehicle for hydrophobic soluble materials. Hydrophobic materials have low solubility in water. Suitable hydrophobic materials have solubility in 100 grams of water of 5 gram of material or less; or 2 gram of material or less; or 1 gram of material or less; or 0.5 gram of material or less; or 0.1 gram of material or less. Hydrophobic soluble materials are soluble in one or more organic solvents. That is, for a given hydrophobic soluble material, at least one organic solvent can be found in which the solubility of that material in 100 grams of that organic solvent is more than 1 gram or material; or more than 5 grams of material. Some suitable hydrophobic soluble materials are soluble, for example, in one or more of acetone, octanol, hexane, or dichloroethane.

Some suitable hydrophobic soluble materials are volatile. Some suitable hydrophobic soluble materials have, for example, boiling point at one atmosphere pressure of 50° C. or lower; or 40° C. or lower; or 30° C. or lower. Independently, some suitable hydrophobic soluble materials have, for example, boiling point at one atmosphere pressure of 10° C. or higher; or 20° C. or higher.

Other suitable hydrophobic soluble materials are not volatile. That is, they have boiling point at one atmosphere pressure of above 50° C.

When a cationic polymer is said herein to be suitable as a delivery vehicle for a hydrophobic soluble material, the following is meant. The hydrophobic soluble material can be mixed with an aqueous composition containing a cationic polymer latex of the present invention, and the mixture will be stable. A mixture is stable when it does not exhibit any of the following: phase separation, sedimentation, flocculation, agglomeration, or combination thereof. While the present invention is not limited to any specific mechanism, it is contemplated that some or all of the hydrophobic soluble material will either be absorbed into the particles of the cationic polymer latex or will be adsorbed onto the surface of those particles, or a combination thereof. When the aqueous composition is later brought into contact with a substrate, it is contemplated that some or all of the hydrophobic soluble material will transfer become absorbed into or adsorbed onto the substrate. Then, when the substrate is dried, it will also contain some absorbed or adsorbed hydrophobic soluble material. In some of such cases, especially if the hydrophobic soluble material is volatile, the hydrophobic soluble material will then evaporate from the dried substrate. In others of such cases, especially if the hydrophobic soluble material is not volatile, the hydrophobic material will remain absorbed on or absorbed into the substrate.

An aqueous composition of the present invention that contains at least one hydrophobic soluble material may be made by combining the various ingredients in any order. For example, a cationic polymer latex can be mixed with a hydrophobic soluble material, and the resulting mixture can then be mixed with an active component. For another example, an active component and a hydrophobic soluble material may be mixed together, and the resulting mixture can then be mixed with a cationic polymer latex. For yet another example, an active component and a cationic polymer latex may be mixed together, and the resulting mixture can then be mixed with a hydrophobic soluble material. Optionally, one or more additional ingredient (one or more cationic polymer latex, one or more active component, one or more hydrophobic soluble material, or combination thereof), any of which may independently be the same as or different from ingredients in the mixture, may be added to the composition before, during, or after any of the steps in any of the procedures described above. Independently, any of the mixing procedures described above may optionally be performed in the presence of water, optionally in addition to the water that is part of the cationic polymer latex.

For example, a hydrophobic soluble material may be used that is also a fragrance. A "fragrance," as used herein, is a compound that has a desirable odor, a mixture of such compounds, a composition containing one or more such compounds, a perfume, or a mixture thereof. Such a fragrance may be, for example, mixed with a cationic polymer latex and other ingredients to make an aqueous domestic composition of the present invention. In some embodiments in which a fragrance is used, the amount of fragrance, by weight based on the total solids weight of the aqueous domestic composition, is 0.2% or more; or 0.5% or more; or 1% or more. Independently, in some embodiments in which a fragrance is used, the amount of fragrance, by weight based on the total solids weight of the aqueous domestic composition, is 10% or less; or 7% or less; or 5% or less.

In some embodiments in which the domestic composition of the present invention contains fragrance, the domestic composition may be designed, for example, to be suitable as a fabric softener for use in laundry operation. Normally, a fabric softener contains one or more cationic surfactant. A fabric may be, for example, put through such a laundry operation and then dried. The aqueous domestic composition of the present invention could be, for example, added to the laundry operation during a rinsing procedure. After drying, the hydrophobic soluble fragrance may then, for example, be released into the air, imparting an apparent desirable odor to the fabric. In some of such embodiments, the cationic polymer of the present invention contains one or more anionic monomer as polymerized units. In other of such embodiments, the cationic polymer of the present invention contains no anionic monomer as polymerized units.

Independently, a composition of the present invention could be designed to be suitable as a liquid laundry detergent and could effectively deliver fragrance to a fabric during a washing cycle. Such a liquid laundry detergent normally contains one or more anionic surfactant and sometimes also contains one or more anionic surfactant. In some of such embodiments, the cationic polymer of the present invention contains one or more anionic monomer as polymerized units.

Also, a composition of the present invention could be designed to be suitable as a liquid laundry detergent that also contains fabric softener. Such a composition could effectively deliver fragrance to a fabric during a washing cycle. Such a liquid laundry detergent normally contains one or more anionic surfactant, sometimes also contains one or more nonionic surfactant, and normally contains one or more surfactant that is either cationic or amphoteric. In some of such embodiments, the cationic polymer of the present invention contains one or more anionic monomer as polymerized units. In other of such embodiments, the cationic polymer of the present invention contains no anionic monomer as polymerized units.

For another example, in some embodiments, a composition of the present invention could be designed to be suitable as a hair shampoo or hair conditioner or a formulation that is both a hair shampoo and a hair conditioner. Among some of such embodiments, the cationic polymer could function as a delivery vehicle to deliver a hydrophobic soluble material to hair as a result of shampooing or conditioning the hair. Hair shampoo normally contains one or more anionic surfactant and sometimes also contains one or more nonionic surfactant. Hair conditioner normally contains one or more cationic surfactant and sometimes also one or more nonionic surfactant. Compositions that are both hair shampoo and hair conditioner normally contain one or more cationic surfactant and one or more anionic surfactant, sometimes also with one or more nonionic surfactant, and sometimes also with one or more amphoteric surfactant. Some hydrophobic soluble materials that could be used in such embodiments include, for example, fragrances, vitamins, provitamins, antioxidants, other materials desirable for deposition on hair, and combinations thereof. In some of such embodiments, the cationic polymer of the present invention contains one or more anionic monomer as polymerized units. In other of such embodiments, the cationic polymer of the present invention contains no anionic monomer as polymerized units.

For another example, in some embodiments, a composition of the present invention could be designed to be suitable as a preparation suitable for application to human skin, such as a lotion or cream. Such preparations may be designed to promote healing, to moisturize, to block solar rays, to perform other functions, or combinations thereof. Such preparations normally contain one or more nonionic surfactant and sometimes also one or more-anionic surfactant. Among some of such embodiments, the cationic polymer could function as a delivery vehicle to deliver a hydrophobic soluble material to skin as a result of applying the preparation to the skin. Some hydrophobic soluble materials that could be used in such embodiments include, for example, fragrances, vitamins, sun-blocking compounds, other materials desirable for deposition on skin, and combinations thereof. Sun-blocking compounds include, for example, octyl methoxycinnamate, 4-methylbenzylidene camphor, avobenzone, oxybenzone, homosalate, and mixtures thereof. In some of such embodiments, the cationic polymer of the present invention contains one or more anionic monomer as polymerized units. In other of such embodiments, the cationic polymer of the present invention contains no anionic monomer as polymerized units.

Among embodiments in which the cationic polymer latex is suitable as a delivery vehicle for a hydrophobic soluble material, it is contemplated that, in some of such embodiments, the domestic composition will be designed so that the hydrophobic soluble material is retained upon the surface to which it is delivered and is then released to the atmosphere when heat is applied to surface. For example, the domestic composition could be a fabric softener that delivers a fragrance to a fabric in such a way that the fragrance is released when the fabric is ironed. For another example, the domestic composition could be a hair conditioner that delivers a fragrance to hair in such a way that the fragrance is released when the hair is dried by exposure to hot air.

Also contemplated are embodiments of the present invention in which a cationic polymer latex as described herein above is used in the process of making paper, including ordinary paper, tissue paper, paperboard, and other forms of paper. It is contemplated to form a paper treatment mixture that includes one or more cationic polymer latex and one or more additional cationic compound. In some embodiments, one or more additional cationic compound is used that is not a cationic polymer latex. Suitable additional cationic compounds include, for example, cationic starch. In some embodiments, the paper treatment mixture includes one or more cationic polymer latex, one or more cationic starch, and, optionally, one or more further cationic compound. In some of such embodiments, one or more cationic polymer latex is used that is useful as a delivery vehicle for one or more hydrophobic soluble material, as described herein above. In some of such embodiments, one or more cationic polymer latex is used as a delivery vehicle for one or more fragrance.

Independently, such a paper treatment mixture may be added to an aqueous slurry of fibers during a papermaking process.

Independently, such a paper treatment mixture may be included in a composition (that optionally contains additional ingredients) that is applied to the surface of paper after it is made, either directly to the paper or on top of one or more previous layer of any composition applied to the paper. Some compositions that include a paper treatment mixture of the present invention may, for example, form coatings that improve the opacity and/or gloss of the paper. Also contemplated are such compositions that form treatments that are used for creping the paper.

Embodiments are contemplated in which a paper treatment mixture of the present invention is included in any one of, or in any combination of, an aqueous slurry of fibers during a papermaking process or a composition applied to paper after it is made.

Independently, in some embodiments employing such a paper treatment mixture, the paper employed is tissue.

EXAMPLES

The following monomers were used in the Examples described herein:
AA=acrylic acid
DMAEA=N,N-dimethylaminoethyl acrylate
DMAEMA=N,N-dimethylaaminoethyl methacrylate
DMAEAMeCl=dimethylaminoethyl acrylate methyl chloride
DVB=divinylbenzene
2-EHA=2-ethylhexyl acrylate
HEMA=2-hydroxyethyl methacrylate
LMA=lauryl methacrylate
MAPTAC=[3-(methacrylolamino)propyl]-trimethylammonium chloride
MMA=methyl methacrylate
VAZO™ 56=2,2'-azobis(2-methylpropionamide)dihydrochloride from E.I. du Pont de Nemours and Company

Example 1

Preparation of Cationic Polymer Latex

To a 1-liter round-bottom flask equipped with a overhead stirrer, thermocouple, condenser and inlets for the addition of monomer and initiators was charged 230 grams of deionized water, 5 grams of 50% Cavasol™ W7 M TL (cyclodextrin from Wacker Fine Chemicals), 0.83 grams of a 0.15% iron sulfate solution, and 20 grams of 50% MAPTAC and set to stir. The flask was heated to 82° C. A monomer emulsion was prepared by charging 85 grams of deionized water and 9.38 grams of 70% Tergitol™ 15-S-40 surfactant to an appropriate container and set to stir. After the surfactant is incorporated into the water, 170.57 grams of Styrene was added slowly to the stirring mixture. Then 22.07 grams of MMA and 22.39 grams of LMA was added to the mixture, followed by 25 grams of HEMA. A cofeed catalyst solution was also prepared by charging 1.07 grams of Vazo™ 56 and 50 grams of deionized water.

At reaction temperature of 82° C., 26.7 grams of the monomer emulsion was charged to the kettle with a 10 gram deionized water rinse, followed by 5 grams of 50% Cavasol™ W7 M TL with a 5 gram water rinse, followed by an initiator solution of 0.25 grams Vazo™ 56 and 10 grams water. The reaction temperature bottomed out at approximately 77° C., and the reaction was then held for 20 minutes. After the 20 minute hold, with the temperature allowed to increase to 82° C., the monomer emulsion cofeed was begun at a rate of 3.4 grams per minute for 90 minutes. Simultaneously the catalyst cofeed was begun at a rate of 0.46 grams per minute for 110 minutes. At the completion of the monomer emulsion cofeed, 8 grams of deionized water was added as a rinse. At the completion of the catalyst cofeed, 2 grams of rinse water was added. The reaction was then held for 30 minutes at 82° C. During the hold, 2 grams of Tergitol™ 15-S-40 surfactant and 10 grams of water were mixed and added to a chaser catalyst mixture of 0.1 grams of Vazo™ 56 and 10 grams of water. After the 30 minute hold was completed the chaser catalyst/surfactant mixture was added to the kettle at a rate of 1.1 grams per minute for 20 minutes. Also added to the kettle at this time was a chaser (i.e., an additional 1 gram of MMA). At the completion of the chaser feed, the reaction was held for 30 additional minutes. After the hold was completed, the reaction was cooled to room temperature and then filtered through a 100 mesh bag and then through a 325 mesh bag.

The resulting latex had the following characteristics. Solids is the weight of solid material left when the latex is evaporated to dryness, as a percentage of the total weight of latex. Grit is the amount of material retained in the mesh bags. Mean particle size was measured with a Brookhaven Instruments Corp. BI-90 device. Residual Monomer amounts were measured by head space gas chromatography.

Solids: 37.38%

Grit: 68 ppm

Mean Particle Size: 152.6 nm

Residual Styrene: 92.4 ppm

Residual MMA: 122.3 ppm

Example 2

Base Formulations

The following Base Formulations were made. The amounts in the table below are parts by solid weight (except for the amount of water, which is parts by weight). Each base formulation was adjusted to the pH shown by addition of citric acid.

|  | Formulation No.: | | | | | |
| --- | --- | --- | --- | --- | --- | --- |
|  | BF1 | BF2 | BF3 | BF4 | BF5 | BF6 |
| Sodium Lauryl Ether Sulfate: | 10 | 7 | 10 | 10 | 10 | 10 |
| Sodium Chloride | 2 | 0.8 | 0.5 | 1 | 1 | 1 |
| alkyl amidopropyl dimethyl betaine |  | 3 | 2 | 2 | 2 | 2 |
| polyquat-7 |  |  | 0.35 |  |  |  |
| polyquat-10 |  |  |  | 0.5 |  |  |
| cetrimonium chloride |  |  |  |  | 0.1 |  |
| guar hydroxypropyl trimonium chloride |  |  |  |  |  | 0.3 |
| water | 88 | 89.2 | 87.15 | 86.5 | 86.9 | 86.7 |
| pH | 4 | 4 | 5 | 5 | 5 | 6 |

Example 3

Polymers

The following polymers were used in the present Examples. The amounts shown are parts by weight.

Polymers CP1 through CP4 are comparative polymers.

CP1=Acusol™ OP-301, commercially available non-cationic opacifying latex polymer, from Rohm and Haas Company CP2=52.46 MMA/47.28 2-EHA 0.26 DMAEMA, as described in Example #8 of US 2004/0110648

CP3=93.83 MMA/6.17 DMAEAMeCl, as described in Example #5 of US 2004/0110648

CP4=97 BA/3 DMAEA, as described in Example #1 of JP S63-122796.

The following example polymers were made using the method in Example 1, herein above.

P5=2 MAPTAC/13 HEMA/72.2 Styrene/8.7 MMA/4.1 LMA

P6=3 MAPTAC/34.6 HEMA/44.4 Styrene/18 MMA

P7=3 MAPTAC/17 HEMA/80 Styrene

P8=3 MAPTAC/11 HEMA/58 Styrene/19 MMA/9 LMA

P9=4 MAPTAC/36 HEMA/42.22 Styrene/8.82 MMA/8.96 LMA

Example 4

Opacity of Polymer Latices

The ability of each polymer latex to provide opacity was tested. Each latex was diluted with water so that the solids of the diluted latex was 1% by solid weight, based on the total weight of the diluted latex. The appearance of the diluted latex was noted, and the diluted latices were ranked. The ranking scale was as follows, from most opaque to least opaque:

VG (very good—most opaque),
G (good),
F (fair),
P (poor—least opaque).

The opacity results were as follows:

| Polymer | Opacity Rating | Appearance |
| --- | --- | --- |
| CP1 | VG | white; opaque |
| CP2 | P | blue-gray; translucent |
| CP3 | P | blue-gray; translucent |
| CP4 | F | blue-gray; translucent |
| P5 | VG | white; opaque |

| Polymer | Opacity Rating | Appearance |
| --- | --- | --- |
| P6 | VG | white; opaque |
| P7 | VG | white; opaque |
| P8 | G | white; opaque |
| P9 | VG | white; opaque |

Example 5

Stability of Formulations

The following formulations were prepared for stability testing. The amounts shown are parts by solid weight. Formulations with Formulation Numbers starting with "C" are comparative formulations.

Formulations were prepared as follows. Each polymer, in latex form, was diluted in water. For each formulation, 96 parts of base formulation was added to 4 parts of diluted polymer latex. The dilution of the diluted polymer was chosen so that the amount of polymer in each formulation would be, by solids weight based on total weight of formulation, between 0.32% and 0.38%, inclusive. The table below shows the "Formulation Number" of the formulation that was made from the corresponding combination of Base Formulation and Polymer. For example, combining Base Formulation BF2 with Polymer P2, using the method described herein above, yielded Formulation F26.

|  |  | Base Formulation Number | | | | | |
| --- | --- | --- | --- | --- | --- | --- | --- |
|  |  | BF1 | BF2 | BF3 | BF4 | BF5 | BF6 |
| Polymer Number | CP1 | CF11 | CF21 | CF31 | CF41 | CF51 | CF61 |
|  | CP2 | CF12 | CF22 | CF32 | CF42 | CF52 | CF62 |
|  | CP3 | CF13 | CF23 | CF33 | CF43 | CF53 | CF63 |
|  | CP4 | CF14 | CF24 | CF34 | CF44 | CF54 | CF64 |
|  | P5 | F15 | F25 | F35 | F45 | F55 | F65 |
|  | P6 | F16 | F26 | F36 | F46 | F56 | F66 |
|  | P7 | F17 | F27 | F37 | F47 | F57 | F67 |
|  | P8 | F18 | F28 | F38 | F48 | F58 | F68 |
|  | P9 | F19 | F29 | F39 | F49 | F59 | F69 |

Stability of each formulation was assessed using the following rating system. Backscattering over time as a function of position (top to bottom) within each sample was determined using a Turbiscan™ instrument, model TLabExpert from Formulaction Company. Changes in backscattering that were uniform from top to bottom were considered flocculation. Changes in backscattering that varied as a function of position in the sample were considered sedimentation or creaming. Samples were observed for one month (or less if they showed poor stability). At the end of the observation period the following rating scale was used:

| Observation | Rating |
| --- | --- |
| severe flocculation and/or sedimentation or creaming | EP = extremely poor |
| moderate flocculation and/or sedimentation or creaming | VP = very poor |
| slight flocculation and/or sedimentation or creaming | P = poor |
| very slight flocculation and/or sedimentation or creaming | F = fair |
| miniscule flocculation and/or sedimentation or creaming | G = good |
| no flocculation and/or sedimentation or creaming | E = excellent |
| not tested | NT |

Each stability test was conducted at two different temperatures. Results of the stability testing is as follows:

| Formulation Number | Temperature (° C.) | Stability Result |
|---|---|---|
| CF11 | 20 | P |
| CF11 | 40 | P |
| CF21 | 20 | VP |
| CF21 | 40 | P |
| CF31 | 20 | EP |
| CF31 | 40 | EP |
| CF41 | 20 | EP |
| CF41 | 40 | EP |
| CF51 | 20 | G |
| CF51 | 40 | F |
| CF61 | 20 | EP |
| CF61 | 40 | EP |

| Formulation Number | Temperature (° C.) | Stability Result |
|---|---|---|
| CF12 | 20 | EP |
| CF12 | 40 | EP |
| CF22 | 20 | EP |
| CF22 | 40 | EP |
| CF32 | 20 | EP |
| CF32 | 40 | EP |
| CF42 | 20 | EP |
| CF42 | 40 | EP |
| CF52 | 20 | EP |
| CF52 | 40 | EP |
| CF62 | 20 | EP |
| CF62 | 40 | EP |

| Formulation Number | Temperature (° C.) | Stability Result |
|---|---|---|
| CF13 | 20 | E |
| CF13 | 40 | E |
| CF23 | 20 | E |
| CF23 | 40 | E |
| CF33 | 20 | F |
| CF33 | 40 | F |
| CF43 | 20 | G |
| CF43 | 40 | G |
| CF53 | 20 | G |
| CF53 | 40 | G |
| CF63 | 20 | G |
| CF63 | 40 | G |

| Formulation Number | Temperature (° C.) | Stability Result |
|---|---|---|
| CF14 | 20 | P |
| CF14 | 40 | P |
| CF24 | 20 | NT |
| CF24 | 40 | VP |
| CF34 | 20 | NT |
| CF34 | 40 | VP |
| CF44 | 20 | NT |
| CF44 | 40 | VP |
| CF54 | 20 | NT |
| CF54 | 40 | VP |
| CF64 | 20 | NT |
| CF64 | 40 | P |

| Formulation Number | Temperature (° C.) | Stability Result |
|---|---|---|
| F15 | 20 | E |
| F15 | 40 | E |
| F25 | 20 | G |
| F25 | 40 | G |
| F35 | 20 | P |
| F35 | 40 | P |
| F45 | 20 | E |
| F45 | 40 | G |
| F55 | 20 | P |
| F55 | 40 | G |
| F65 | 20 | G |
| F65 | 40 | F |

| Formulation Number | Temperature (° C.) | Stability Result |
|---|---|---|
| F16 | 20 | E |
| F16 | 40 | E |
| F26 | 20 | E |
| F26 | 40 | E |
| F36 | 20 | E |
| F36 | 40 | E |
| F46 | 20 | E |
| F46 | 40 | E |
| F56 | 20 | G |
| F56 | 40 | G |
| F66 | 20 | E |
| F66 | 40 | E |

| Formulation Number | Temperature (° C.) | Stability Result |
|---|---|---|
| F17 | 20 | E |
| F17 | 40 | E |
| F27 | 20 | E |
| F27 | 40 | E |
| F37 | 20 | G |
| F37 | 40 | P |
| F47 | 20 | P |
| F47 | 40 | G |
| F57 | 20 | E |
| F57 | 40 | E |
| F67 | 20 | G |
| F67 | 40 | G |

| Formulation Number | Temperature (° C.) | Stability Result |
|---|---|---|
| F18 | 20 | E |
| F18 | 40 | E |
| F28 | 20 | E |
| F28 | 40 | G |
| F38 | 20 | E |
| F38 | 40 | E |
| F48 | 20 | G |
| F48 | 40 | G |
| F58 | 20 | G |
| F58 | 40 | P |
| F68 | 20 | G |
| F68 | 40 | F |

| Formulation Number | Temperature (° C.) | Stability Result |
| --- | --- | --- |
| F19 | 20 | E |
| F19 | 40 | E |
| F29 | 20 | E |
| F29 | 40 | E |
| F39 | 20 | E |
| F39 | 40 | E |
| F49 | 20 | E |
| F49 | 40 | E |
| F59 | 20 | E |
| F59 | 40 | E |
| F69 | 20 | G |
| F69 | 40 | E |

Polymer CP1 is capable of acceptable opacifying, but almost all formulations containing polymer CP1 have stability that is fair or worse. The opacifying results for polymers CP2, CP3, and CP4 show that these polymers have fair or worse opacifying. Polymers P5 through P9 provide both opacity that is good or better and stability that is almost always fair or better.

Example 6A

Delivery of Perfume in Fabric Softening

Two additional example polymers were made using the method of Example 1. In making each of the two additional polymers, MAPTAC was charged to the flask at the start of the process, AA (if used) was also charged to the flask at the start of the process, and the remaining monomers were added to the monomer emulsion. The amounts shown are percent by weight, based on the total weight of monomer.

P10=4 MAPTAC/68.2 styrene/8.8 MMA/10 HEMA/9 LMA

P11=2.5 MAPTAC/68.4 styrene/8.8 MMA/10 HEMA/9 LMA/1.3 AA

Also, perfume/polymer emulsions (PPEs) were made using Chaton Azur E_0612099 perfume compound from V. Mane Fils Company (Le Bar Sur Loup, France) as follows:

To a glass vessel 1.922 grams of the Tergitol™ 15-S-40 (70% active) was added. To the surfactant 16.064 grams of deionized water was added with vigorous agitation. This surfactant/water mixture was stirred for 20 minutes, until all the Tergitol™ 15-S-40 was clearly in solution. To the clear surfactant/water solution, 12.418 grams of fragrance was added slowly with vigorous mixing over 10 minutes by adding the fragrance dropwise into the vortex. The fragrance emulsion was mixed for 30 minutes to give 30.4 grams of the fragrance dispersion, which was a milky white/yellow emulsion. This was stable for several hours, with no further mixing.

In a separate vessel, 100 grams of the cationic polymer latex (approximately 38.2% solids by weight based on the total weight of the latex) was added. At room temperature, the polymer emulsions were agitated using a propeller stirrer so that there was a very good vortex. Over a 10 minute period the fragrance emulsion (30.4 grams total) was added to the polymer emulsion, dropwise into the vortex. The mixture was stirred for 30 minutes minimum.

Two PPEs were made using the above procedure. PPE1 used polymer P10, and PPE2 used polymer P11.

Fabric softener formulations (FSF) were made as follows:

| Ingredient | Description | Manufacturer | Amount (parts by weight as supplied) |
| --- | --- | --- | --- |
| Stepantex ™ VX90 | Cationic softening agent | Stepan | 4 |
| Tergitol ™ 15-S-40 | secondary alcohol ethoxylate nonionic surfactant | Dow | 0.75 |
| PPE | perfume/polymer emulsion | as described herein above | 5 |
| deionized water | | | 90.25 |

Each FSF was adjusted to pH of 2.5 to 3 with HCl.

Two FSFs were made. FSF1 used PPE1, and FSF2 used PPE2. Also, a comparative FSF was made, herein labeled CFSF3. Formulation CFSF3 was the same as FSF1 and FSF2, except that CFSF3 was made using perfume as supplied, in an amount equal to the amount of perfume contained in 5 parts of PPE, instead of using PPE.

FSFs were tested in a front-loader washing machine that used 10 liters of water per cycle, at 60° C. To test FSFs, only the rinse cycle was run, without the wash cycle. 60 ml of FSF was added to the machine. The water in the washing cycle had 20 degrees of French hardness. In each test, 4 terry towels were used in the test run in the machine. After removal from the washing machine, the terry towels were allowed to dry in air.

After drying, the fragrance of the terry towels was evaluated. In each test, a group of observers smelled the terry towels, and each observer rated the fragrances. In each test, the number of observers was between 9 and 12. Each observer compared three groups of towels: the group rinsed with FSF1, the group rinsed with FSF2, and the group rinsed with CFSF3. Each observer gave the best group a rating of 1, the second best group a rating of 2, and the worst group a rating of 3. The rating numbers were then added together to create an overall rating. The results were as follows:

| Formulation | Overall Rating (9 observers) |
| --- | --- |
| CFSF3 | 16 |
| FSF1 | 26 |
| FSF2 | 11 |

FSF2 showed better fragrance deliver than CFSF3.

Example 6B

Fragrance Delivery in Washing

Using the PPEs described above in Example 6A, Laundry detergent formulations (LDFs) were made as follows:

| Ingredient | Description | Manufacturer | parts by weight as supplied |
| --- | --- | --- | --- |
| citric acid anhydrous | | | 2.5 |
| NaOH 30% solution | | | 8.5 |
| propylene glycol | | | 2 |
| Marlon ™ AS3 | alkyl benzene sulfonic acid | Sasol | 4.8 |
| Marlinat 242/28 | alkyl ether sulphate | Sasol | 20 |

-continued

| Ingredient | Description | Manufacturer | parts by weight as supplied |
|---|---|---|---|
| Marlipal ™ O 13/79 | nonionic ethoxylate | Sasol | 6.7 |
| Marlipal ™ O 13/120 | nonionic ethoxylate | Sasol | 2.2 |
| coconut fatty acid | | | 2 |
| Acusol ™ 820 | thickener | Rohm and Haas Company | 1.4 |
| Perfume | perfume/polymer emulsion | described herein above | 5 |
| Deionized Water | | | to make 100 parts |

Each LDF was adjusted to pH of approximately 8.5 with NaOH.

Two LDFs were made. LDF1 used PPE1, and LDF2 used PPE2. Also, a comparative LDF was made, labeled CLDF3, using perfume as supplied, in an amount equal to the amount of perfume contained in 5 parts of PPE.

The LDFs were tested in the same front-loading washing machine as described above in Example 6A, except that, for testing LDFs, one single complete wash cycle (which included a rinse cycle) was run. An LDF was used as the detergent in the washing portion of the cycle, and no fabric softener was added to the rinse cycle. The towels were allowed to dry in air and were evaluated and rated by 12 observers as described above in Example 6A. The results were as follows:

| Formulation | Overall Rating |
|---|---|
| CLDF3 | 22 |
| LDF1 | 17 |
| LDF2 | 27 |

Formulation LDF1 delivered better fragrance than CLDF3.

Example 7

Molecular Weights of Polymers

Polymers were analyzed using Size Exclusion Chromatography (SEC) as follows.

Samples were dissolved in tetrahydrofuran, and polymer solutions were filtered using 0.45 micrometer PTFE filter. Separations were carried out on an Agilent 1100 liquid chromatograph system. System control, data acquisition, and data processing were performed with Agilent GPC Data Analysis Software for Agilent Chemstation. Separations were performed at 1 ml/min using SEC column set composed of two PL gel Mixed A columns (300×7.5 mm ID) and PL gel 10 micrometer guard column (50×7.5 mm ID) packed with polystyrene-divinylbenzene gel (pore size marked as "Mixed A", particle size 20 micrometer) purchased from Polymer Laboratories.

Relative molecular weight of analyzed samples was calculated using a linear calibration curve determined by polystyrene standards of molecular weight 580 to 7,500,000. The results were as follows, reported as weight-average molecular weight (Mw). Samples marked "N.O." had no peak observed in the SEC test.

| Sample | Mw |
|---|---|
| CP1 | 387,900 |
| CP2 | N.O. |
| CP3 | N.O. |
| CP4 | 103,300 |
| P5 | 272,100 |
| P6 | 83,050 |
| P7 | 182,400 |
| P8 | 197,200 |
| P10 | 203,300 |
| P11 | 237,000 |

Example 8

Zeta Potential Measurements

Zeta potential was measured at approximately 5 mM KCl at 25° C. using Malvern Zetasizer™ instrument. Twelve measurements were made back-to-back on each sample, with the first six measurements being discarded as having occurred while the sample cell was coming to 25° C. thermal equilibrium with the instrument's sample block. Reported measurements in the table below are the average of anywhere from three to six measurements on that single solution studied.

Dilutions of each latex were varied so as to give dilute solutions with good light scattering response on the instrument. pH adjustments were made using dilute HCl or dilute NaOH. All solutions were roughly equilibrated to pH then allowed to stand for approximately 30 minutes. Solutions were then adjusted to final pH and allowed to stand a minimum of 30 minutes prior to analysis. Concentrations studied were approximately 0.02 to 0.15 mg polymer solids per milliliter of diluent.

| Sample | pH | Zeta Potential (mV) |
|---|---|---|
| CP2 | 4.5 | 12.2 |
| CP3 | 4.5 | 12.2 |
| CP4 | 4.5 | 8.4 |
| P5 | 4.5 | 48.6 |
| P6 | 4.5 | 40.6 |
| P7 | 4.5 | 45.7 |
| P8 | 4.5 | 45.6 |
| P10 | 4.5 | 45.7 |
| P11 | 3.0 | 45.7 |
| P11 | 4.0 | 43.4 |
| P11 | 5.5 | 27.1 |
| P11 | 7.0 | 13.4 |
| P11 | 8.0 | 3.42 |

Example 9

Published Refractive Indices of Various Homopolymers

The following are values published by D. W. Van Krevelen, in *Properties of Polymers*, third edition, published by Elsevier in 1990 ("VK") or by Parker-TexLoc Co., Fort Worth, Tex., USA, at http://www.texloc.com/closet/cl_refractiveindex.html ("TL").

| poly(Styrene) | poly(MMA) | poly(BA) | poly(AA) | poly(LMA) | poly(HEMA) |
|---|---|---|---|---|---|
| 1.591 (VK) | 1.490 (VK) | 1.466 (VK) | 1.5270 (TL) | 1.474 (VK) | 1.512 (TL) |

Additionally, poly(MAPTAC) was measured using a homopolymer solution in water (CAS number 68039-13-4; commercial product MAQUAT™ PQ-125 from Mason Chemical Company) and the Lorentz-Lorentz method, as taught in Journal of Chemical and Engineering Data, volume 37, pages 310-313, 1982. The refractive index of poly(MAPTAC) was found to be 1.59.

Example 10

Calculated Refractive Indices

Using the Methods Taught in Example 9 Herein Above, the Following Refractive Indices were Calculated:

| P5 | P6 | P7 | P8 | P9 | P10 | P11 |
|---|---|---|---|---|---|---|
| 1.570 | 1.547 | 1.580 | 1.557 | 1.549 | 1.569 | 1.568 |

We claim:
1. An aqueous liquid domestic composition comprising
   (i) one or more active component selected from the group consisting of
      (A) 3% to 50% by weight, based on the total solids weight of said domestic composition, one or more softening agent,
      (B) 2% to 90% by weight, based on the total solids weight of said domestic composition, one or more anionic surfactant, and
      (C) a mixture consisting of
         (I) 1% to 25% by weight, based on the total solids weight of said domestic composition, one or more softening agent, and
         (II) 5% to 75% by weight, based on the total solids weight of said domestic composition, one or more anionic surfactant, and
      (D) 0.1% to 30% by weight, based on the total solids weight of said domestic composition, one or more amphoteric compound; and
   (ii) one or more cationic polymer latex consisting essentially of
      (a) 0.5% to 6% by weight, based on the dry weight of said polymer, polymerized units of one or more cationic monomer,
      (b) 30% to 99.5% by weight, based on the dry weight of said polymer, polymerized units of one or more aromatic monomer, and
      (c) optionally, polymerized units of one or more additional monomer, selected from the group consisting of
         (c1) anionic monomers,
         (c2) alkyl esters of acrylic acid or methacrylic acid wherein the alkyl group is an unsubstituted alkyl group having 8 or fewer carbon atoms,
         (c3) aliphatic esters of acrylic acid or methacrylic acid wherein the aliphatic group is an unsubstituted hydrocarbon group having 9 or more carbon atoms,
         (c4) hydroxyalkyl esters of acrylic acid or methacrylic acid or an amide of acrylic acid or methacrylic acid,
         (c5) crosslinking monomer selected from the group consisting of divinyl benzene and esters of acrylic acid or methacrylic acid with a polyol, and
         (c6) substituted amides of acrylic acid or methacrylic acid
   wherein said cationic polymer latex has no anionic monomer as polymerized units, and
   wherein said active component is 3% to 50% by weight, based on the total weight of said domestic composition, one or more softening agent, and wherein said softening agent is selected from the group consisting of quaternary ammonium salt surfactants and water-soluble cationic polymers.

2. The liquid domestic composition of claim 1, wherein said cationic polymer comprises, as polymerized units, one or more said additional monomer, and wherein said additional monomer comprises one or more HE/A monomer.

3. The liquid domestic composition of claim 1, wherein said cationic polymer consists essentially of polymerized units of said cationic monomer and said aromatic monomer.

4. The liquid domestic composition of claim 1, wherein the amount of said aromatic monomer in said cationic polymer latex is 40% or more by weight based on the dry weight of said polymer.

5. The liquid domestic composition of claim 1, further comprising one or more hydrophobic soluble material.

6. A method of cleaning fabric, comprising contacting said fabric with the liquid domestic composition of claim 1 and drying said fabric or allowing said fabric to dry.

7. The liquid domestic composition of claim 1, wherein said aromatic monomer is selected from the group consisting of alkyl-substituted styrenes, halo-substituted styrenes, alkoxy-substituted styrenes, (meth)acrylate esters in which the ester group contains an aromatic ring, phenyl (meth)acrylates, 4-methoxy-2-methyl styrene, styrene sulfide, N-benzyl (meth)acrylamide, and mixtures thereof.

8. The liquid domestic composition of claim 1, wherein said aromatic monomer is styrene.

9. An aqueous liquid domestic composition comprising
   (i) one or more active component that is 3% to 50% by weight, based on the total solids weight of said domestic composition, one or more softening agent, wherein said softening agent is selected from the group consisting of quaternary ammonium salt surfactants and water-soluble cationic polymers;
   (ii) one or more cationic polymer latex that consists of
      (a) 0.5% to 6% by weight, based on the dry weight of said polymer, polymerized units of one or more cationic monomer,
      (b) 30% to 99.5% by weight, based on the dry weight of said polymer, polymerized units of one or more aromatic monomer, wherein said aromatic monomer is selected from the group consisting of styrene, alkyl-substituted styrenes, halo-substituted styrenes, alkoxy-substituted styrenes, (meth)acrylate esters in which the ester group contains an aromatic ring, phenyl (meth)acrylates, 4-methoxy-2-methyl styrene, styrene sulfide, N-benzyl (meth)acrylamide, and mixtures thereof, and
(c) optionally, polymerized units of one or more additional monomer, selected from the group consisting of
 (c1) anionic monomers,
 (c2) alkyl esters of acrylic acid or methacrylic acid wherein the alkyl group is an unsubstituted alkyl group having 8 or fewer carbon atoms,
 (c3) aliphatic esters of acrylic acid or methacrylic acid wherein the aliphatic group is an unsubstituted hydrocarbon group having 9 or more carbon atoms,
 (c4) hydroxyalkyl esters of acrylic acid or methacrylic acid or an amide of acrylic acid or methacrylic acid,
 (c5) crosslinking monomer selected from the group consisting of divinyl benzene and esters of acrylic acid or methacrylic acid with a polyol, and
 (c6) substituted amides of acrylic acid or methacrylic acid.

10. The liquid domestic composition of claim 9, wherein said cationic polymer comprises, as polymerized units, one or more said additional monomer, and wherein said additional monomer comprises one or more hydroxy-alkyl (meth) acrylic ester.

11. The liquid domestic composition of claim 9, wherein the amount of said aromatic monomer in said cationic polymer latex is 40% or more by weight based on the dry weight of said polymer.

12. The liquid domestic composition of claim 9, wherein said cationic polymer latex has no anionic monomer as polymerized units.

13. The liquid domestic composition of claim 1, wherein said cationic polymer latex is made by aqueous emulsion polymerization.

14. The liquid domestic composition of claim 9, wherein said cationic polymer latex is made by aqueous emulsion polymerization.

15. A method of cleaning fabric, comprising contacting said fabric with the liquid domestic composition of claim 9 and drying said fabric or allowing said fabric to dry.

16. An aqueous liquid domestic composition comprising
 (i) one or more softening agent
 (ii) one or more cationic polymer latex consisting essentially of
  (a) 0.5% to 6% by weight, based on the dry weight of said polymer, polymerized units of one or more cationic monomer,
  (b) 30% to 99.5% by weight, based on the dry weight of said polymer, polymerized units of one or more aromatic monomer, and
  (c) optionally, polymerized units of one or more additional monomer, selected from the group consisting of
   (c2) alkyl esters of acrylic acid or methacrylic acid wherein the alkyl group is an unsubstituted alkyl group having 8 or fewer carbon atoms,
   (c3) aliphatic esters of acrylic acid or methacrylic acid wherein the aliphatic group is an unsubstituted hydrocarbon group having 9 or more carbon atoms,
   (c4) hydroxyalkyl esters of acrylic acid or methacrylic acid or an amide of acrylic acid or methacrylic acid,
   (c5) crosslinking monomer selected from the group consisting of divinyl benzene and esters of acrylic acid or methacrylic acid with a polyol, and
   (c6) substituted amides of acrylic acid or methacrylic acid, wherein said cationic polymer latex has no anionic monomer as polymerized units,
wherein said cationic polymer latex has no anionic monomer as polymerized units.

17. The liquid domestic composition of claim 16, wherein said cationic polymer latex is made by aqueous emulsion polymerization.

18. A method of cleaning fabric, comprising contacting said fabric with the liquid domestic composition of claim 16 and drying said fabric or allowing said fabric to dry.

19. The liquid domestic composition of claim 16, wherein said cationic monomer is a quaternary ammonium salt compound.

20. The liquid domestic composition of claim 16, wherein said cationic polymer latex consists of
 (a) 0.5% to 6% by weight, based on the dry weight of said polymer, polymerized units of one or more cationic monomer,
 (b) 30% to 99.5% by weight, based on the dry weight of said polymer, polymerized units of one or more aromatic monomer, and
 (c) optionally, polymerized units of one or more additional monomer, selected from the group consisting of
  (c2) alkyl esters of acrylic acid or methacrylic acid wherein the alkyl group is an unsubstituted alkyl group having 8 or fewer carbon atoms,
  (c3) aliphatic esters of acrylic acid or methacrylic acid wherein the aliphatic group is an unsubstituted hydrocarbon group having 9 or more carbon atoms,
  (c4) hydroxyalkyl esters of acrylic acid or methacrylic acid or an amide of acrylic acid or methacrylic acid,
  (c5) crosslinking monomer selected from the group consisting of divinyl benzene and esters of acrylic acid or methacrylic acid with a polyol, and
  (c6) substituted amides of acrylic acid or methacrylic acid.

* * * * *